United States Patent [19]
Won

[11] Patent Number: 5,963,035
[45] Date of Patent: Oct. 5, 1999

[54] ELECTROMAGNETIC INDUCTION SPECTROSCOPY FOR IDENTIFYING HIDDEN OBJECTS

[75] Inventor: I. J. Won, Raleigh, N.C.

[73] Assignee: Geophex, Ltd., Raleigh, N.C.

[21] Appl. No.: 08/915,656

[22] Filed: Aug. 21, 1997

[51] Int. Cl.$^6$ .............. G01V 3/08; G01V 3/36; G01V 3/11; G01N 27/72
[52] U.S. Cl. .......... 324/329; 324/232; 324/233; 324/239; 324/335
[58] Field of Search .............. 324/67, 326–329, 324/334–337, 202, 232, 233, 239–243

[56] References Cited

U.S. PATENT DOCUMENTS

| | | | |
|---|---|---|---|
| 2,731,596 | 1/1956 | Wait et al. | 324/335 |
| 3,950,695 | 4/1976 | Barringer | 324/336 X |
| 4,255,710 | 3/1981 | Weber | 324/328 |
| 4,616,184 | 10/1986 | Lee et al. | 324/335 |
| 4,628,265 | 12/1986 | Johnson et al. | 324/329 |
| 4,868,910 | 9/1989 | Maulding | 324/233 |
| 4,942,360 | 7/1990 | Candy | 324/329 |
| 4,975,646 | 12/1990 | Llamas Llamas et al. | 324/328 |
| 4,990,851 | 2/1991 | Spies | 324/242 X |
| 5,189,366 | 2/1993 | Mayo | 324/233 |
| 5,416,411 | 5/1995 | Elsmore | 324/202 X |
| 5,506,506 | 4/1996 | Candy | 324/329 |
| 5,557,206 | 9/1996 | Won | 324/329 |
| 5,642,050 | 6/1997 | Shoemaker | 324/329 |

OTHER PUBLICATIONS

GEM–3: A Monostatic Broadband Electromagnetic Induction Sensor, I.J. Won, Dean Keiswetter, David R. Hanson, Elena Novikova & Thomas M. Hall, "Journal of Environmental & Engineering Geophysics", vol. 2, No. 1, Mar. 1997, pp. 53–56.

GEM–2: A New Multifrequency Electromagnetic Sensor, I.J. Won, Dean A. Keiswetter, George R.A. Fields, and Lynn C. Sutton, "Journal of Environmental & Engineering Geophysics", vol. 1, No. 2, Aug. 1996, pp. 129–137.

*Primary Examiner*—Gerard Strecker
*Attorney, Agent, or Firm*—Coats & Bennett, PLLC

[57] ABSTRACT

A spectrogram of secondary magnetic field strength as a function of frequency and spatial relationship is used to identify hidden objects. A time-varying multi-frequency primary electromagnetic field is generated, preferably over the range 100 Hz to 300 kHz, which induces a time-varying multi-frequency secondary electromagnetic field about the hidden object. The strength of the secondary field, typically inphase and quadrature, is plotted as a spectrogram over a low frequency broadband spectrum as a function of frequency and spatial relationship between the hidden object and the secondary field strength detector. From this spectrogram, indications may be had of the hidden object's characteristics such as location, size and shape, and material composition. Preferably, the measured spectrogram is compared against a library of reference spectrograms by a computer to identify the hidden object.

22 Claims, 7 Drawing Sheets

ELECTROMAGNETIC INDUCTION SPECTROSCOPY FOR IDENTIFYING HIDDEN OBJECTS

FIELD OF THE INVENTION

The present invention relates to methods for identifying and characterizing hidden objects, and more particularly to a method of inducing an electromagnetic field about a hidden object and identifying and characterizing the hidden object based on the electromagnetic response of the secondary field over a low frequency broadband spectrum.

BACKGROUND OF THE INVENTION

Electromagnetic induction has long been used to detect hidden or buried metal objects. Typically a magnetic field generator propagates a primary electromagnetic field that in turn induces a secondary electromagnetic field in a nearby hidden object. A magnetic field sensor spaced from the hidden object senses the induced secondary electromagnetic field and consequently in the process the hidden object is detected.

Detection of presence alone reveals little about the hidden object. If the detection is accurate, that is the target detected is indeed a target and not a false target, about the only conclusion that can be reached is that the detected object is at least partially metal. No conclusions, or even postulations, can be made about the material composition of the hidden object or the object's size and shape. Further, detection alone is incapable of shedding light on other important object characteristics such as conductivity and magnetic permeability.

In the past, simple detection has been used, for example, by the military and others to detect buried land mines and unexploded ordinances. Once detected, it is common practice in certain cases to recover the land mines and buried ordinances through excavation. Because of the nature of conventional electromagnetic induction detection, one can never be sure that the detected object is in fact a targeted land mine or an unexploded ordinance. Thus, to some degree at least, excavation for such objects is not always productive because of detected false targets and because the detected object may turn out to be something other than a land mine or buried ordinance.

In the end, conventional metal detectors are simply not designed to do any more than simply detect the presence of a metal object. This is because most conventional metal detectors operate at a single frequency while a few may have the capability of operating at a small number of discrete frequencies. Because of this frequency limitation, conventional metal detectors are unable to induce a continuous varying frequency response in an object. As such, various metal detector devices have tried other approaches to identify a hidden object. For instance, U.S. Pat. No. 5,506,506 to Candy discloses a metal detector that utilizes a magnetic pulse approach. The Candy device sends a magnetic pulse towards the hidden object and then measures the time decay response of the secondary magnetic field in an attempt to identify whether the hidden object is ferrous or non-ferrous. Such a method is incapable of identifying the size or shape of the hidden object or of determining other material properties of the hidden object.

U.S. Pat. No. 5,642,050 to Shoemaker discloses a metal detector that uses a small number of pre-determined discrete frequencies in an attempt to identify a hidden object. Shoemaker discloses using typically two, but up to four, pre-determined discrete frequencies to generate a primary magnetic field. The induced secondary magnetic field is then detected and used to identify the hidden object. Like Candy, the Shoemaker approach relies on differences in magnetic decay properties to distinguish ferrous from non-ferrous objects. The Shoemaker device is incapable of identifying the size or shape of the hidden object or of determining other material properties of the hidden object.

Basic electromagnetic theory suggests that different hidden objects will exhibit different responses across a low-frequency broadband spectrum and that these different responses will be indicative of various object characteristics such as size and shape and magnetic permeability and conductivity. Thus, without the capability of generating time-varying multi-frequencies, conventional metal detectors cannot be expected to induce multi-frequency responses in objects that could be used to evaluate features and characteristics of the object.

Thus, there is a need for a method or process that not only detects hidden objects but also is capable of identifying certain features or characteristics of an object such as material composition, geometry and size, conductivity, magnetic permeability, etc.

SUMMARY OF THE INVENTION

The present invention entails a method of generating a spectral signature or character profile that may uniquely identify a hidden object. In particular, when a hidden object is exposed to a low frequency primary electromagnetic field, it produces a secondary field. By measuring the secondary field through a low frequency broadband spectrum, a "fingerprint" of the object can be produced. The "fingerprint" or spectral signature is sometimes referred to herein as a spectrogram and the spectrogram is capable of imparting information that is indicative of object features and characteristics such as material composition, geometry and shape, conductivity, and magnetic permeability.

In the basic method of the present invention, a time-varying multi-frequency primary electromagnetic field is generated. In response to the primary field, a time-varying secondary electromagnetic field is induced in a hidden object. Thereafter, the method entails measuring the strength of the induced secondary field over a segment of a low frequency broadband spectrum and utilizing the strength or response of the induced secondary field within the spectrum to characterize or identify features and characteristics of the hidden object.

In one particular process, the measured strength of the secondary field is plotted as a function of frequency over the broadband spectrum. This produces the spectrogram. Based on past experience, empirical reference data, and theoretical analysis, one can identify certain features or characteristics of the hidden object based on this spectrogram.

Further, in one embodiment of the present method, the measured spectrogram can be compared to a library of empirically produced reference spectrograms. The library of reference spectrograms would include spectrograms for a wide variety of objects having different but known material compositions, sizes and shapes, conductivity, magnetic permeability, etc. By comparing the measured spectrogram with one or more similar or related reference spectrograms, one can begin to describe, or at least postulate, certain features of the hidden object that is the subject of the measured spectrogram.

It is therefore an object of the present invention to provide an electromagnetic induction method that can be used to identify and characterize hidden objects.

Another object of the present invention is to provide an electromagnetic induction method for identifying hidden objects that produce a spectrogram that extends or covers a low frequency broadband spectrum wherein the spectrogram itself forms a "fingerprint" or a spectral signature that can be used to identify the hidden object that is the subject of the spectrogram.

Other objects and advantages of the present invention will become apparent and obvious from a study of the following description and the accompanying drawings which are merely illustrative of such invention.

DETAILED DESCRIPTION OF THE INVENTION

Figure 1A:
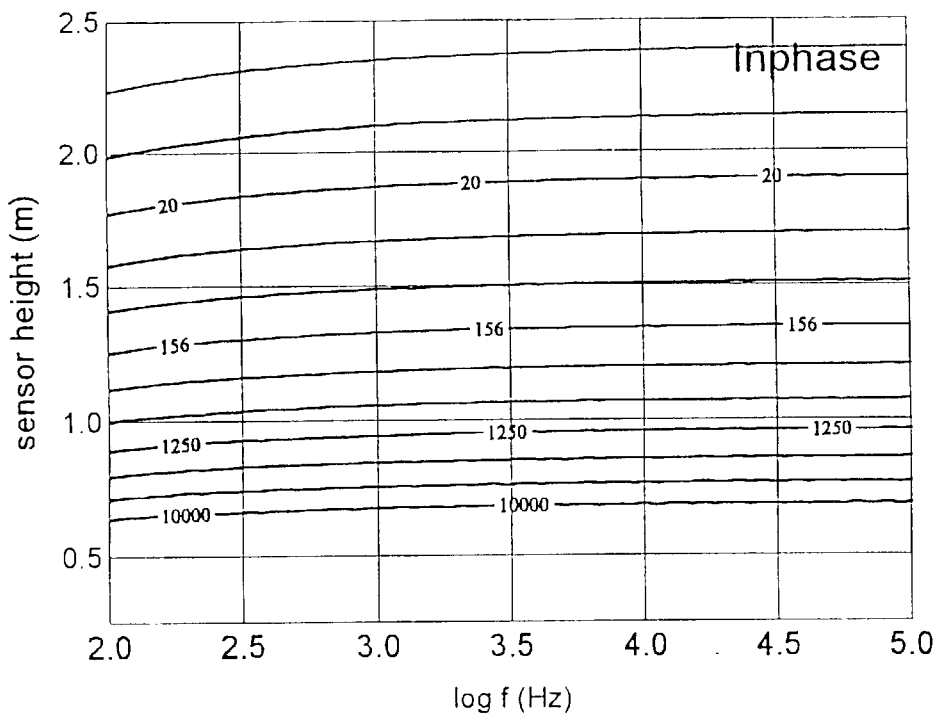
FIG. 1A is a theoretical spectrogram of inphase response as a function of frequency and spatial relationship for a 15 cm sphere having a conductivity of $2 \times 10^6$ s/m and a relative magnetic permeability of $\eta=1$.

The method of the present invention includes inducing a magnetic field in an object and measuring the strength of the responsive induced field at a detector over a low frequency broadband spectrum. By reviewing and studying the measured strength of the induced field over a segment of the broadband spectrum, a response emerges that is indicative of the character of the object. This response, when plotted as a function of frequency and spatial relationship between the detector and the object, produces a what is called herein a spectrogram. Examples of spectrograms can be seen in FIG. 1 and FIG. 2 and these examples will be discussed subsequently herein. It must be noted that plotting, as used herein, is not limited to physical graphical representations, but also includes bit mapped virtual graphs, data arrays, or any other method of representing or storing one or more dependent variables as a function of one or more independent variables. The process of using these spectrograms to identify hidden objects is referred to as Electromagnetic Induction Spectroscopy.

Based on experience, empirical data, and/or theoretical analysis, one is able to translate the response spectrogram into a description of certain properties or characteristics of the object producing the induced magnetic field. For example, and as will be discussed herein, the response spectrogram can be informative relative to the object's material composition, size and shape, conductivity, and magnetic permeability.

The method of the present invention utilizes an electromagnetic field generator that is operative to generate a primary electromagnetic field which induces a relatively weak secondary electromagnetic field in an object within the primary field. The secondary magnetic field is then measured using a detector. Typically, the electromagnetic field generator and the detector are combined in one device, sometimes referred to simply as an electromagnetic field generator. Details of electromagnetic field generators are not dealt with herein because such is not per se material to the present invention, are well-known by those skilled in the art, and are commercially available. For example, such an electromagnetic field generator is manufactured under the trademark "GEM-300" by Geophysical Survey Systems, Inc. of 13 Klien Drive, North Salem, N.H. 03073-0097. For an understanding of magnetic field generator technology, one is referred to the disclosure found in U.S. Pat. No. 5,557,206, the disclosure of which is expressly incorporated herein by reference.

Generally, the electromagnetic field generator includes a transmitter that functions to emit or propagate a time-varying multi-frequency primary electromagnetic field. That is, the generator is capable of generating a primary electromagnetic field that includes a variable frequency over a selected range, such as over a low frequency broadband spectrum. A low frequency broadband spectrum herein means a frequency range of about 100 Hz to about 300 kHz.

Moreover, the generator includes a magnetic field sensor that is operative, through a computer, to monitor and sense the response of an induced, or secondary, electromagnetic field. As those skilled in the art will appreciate, magnetic fields are typically quantified in terms of strength which can be expressed in terms of electromotive force or emf. Thus, when reference is made herein to the response of the induced (or secondary) electromagnetic field, this essentially refers to the strength of that field. While strength can be measured in various ways, one particular approach separates the inphase and quadrature responses of the induced field in a manner well known in the art. Thus, in the examples that are subsequently disclosed and discussed herein, the strength of the induced field is expressed separately as an inphase response and a quadrature response, both of which are well-known approaches used to quantify the strength of an induced magnetic field response.

In specifically quantifying magnetic field strength, the strength of the induced field may be expressed relative to the strength of the generated primary field. More particularly, the strength of the induced field may be expressed as parts per million (ppm) relative to the corresponding primary field strength. As will be appreciated from subsequent portions of the disclosure, the ppm strength response can be positive or negative, indicating relative phase polarity with respect to the primary electromagnetic field.

In studying the responses of induced magnetic fields in buried metal objects, it was observed that the responses of the induced fields vary continuously as the frequency of the transmitter of the electromagnetic field generator changes. In the way of a few examples, it was repeatedly observed that certain anomalies found in responses have opposite polarity at certain frequencies depending on the material composition of the target object. Also, based on tests and observations, it appeared that the response of an induced field varied with the shape and size of the target object. Based on these preliminary observations, it was concluded that the response of the induced magnetic field associated with an object could be used to help characterize qualities of the object such as the material composition of the object or even the shape and size of the object.

These basic observations and conclusions have been verified through theoretical analysis. For example, FIGS. 1A–1D depict a series of spectrograms showing inphase and quadrature responses for two different objects based on the theoretical responses of an induced magnetic field in each of the objects. The theoretical analysis will not be dealt with herein in detail because such is not per se material to the present invention. The basis for the theoretical analysis was a metal sphere having a 15 centimeter radius and a conductivity of $2 \cdot 10^6$ s/m (siemen/m). It was further assumed that the primary electromagnetic field was generated by an electromagnetic field generator having a concentric transmitter and sensor configuration and capable of producing a sweep frequency of 90 Hz to 100 kHz. For purposes of the theoretical analysis, the electromagnetic field generator was assumed to be spaced directly above the sphere, and to be operating in vertical-dipole mode. The distance between the generator and the center of the sphere was assumed to vary from about 0.5 to 2.5 meters. Two different spheres were used in this theoretical analysis. In one case, the sphere was conductive and was considered to be magnetically non-permeable ($\mu$=1). In the case of the second sphere, it was considered to be conductive and magnetically permeable with a relative permeability of 500 ($\mu$=500).

Figure 1B:
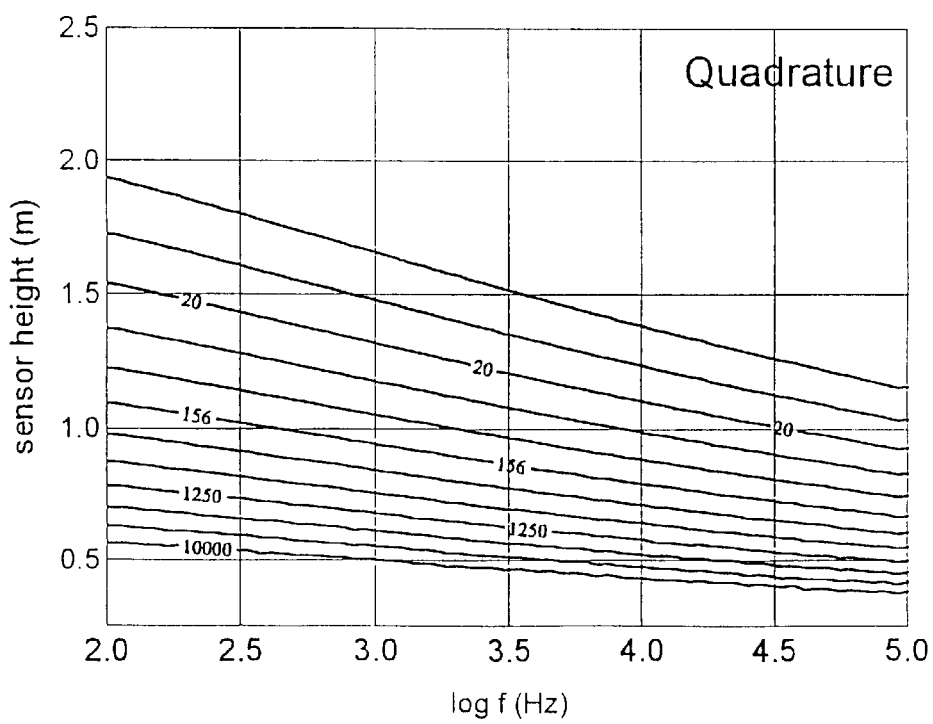
FIG. 1B is a theoretical spectrogram of quadrature response as a function of frequency and spatial relationship for the object of FIG. 1A.
Figure 1C:
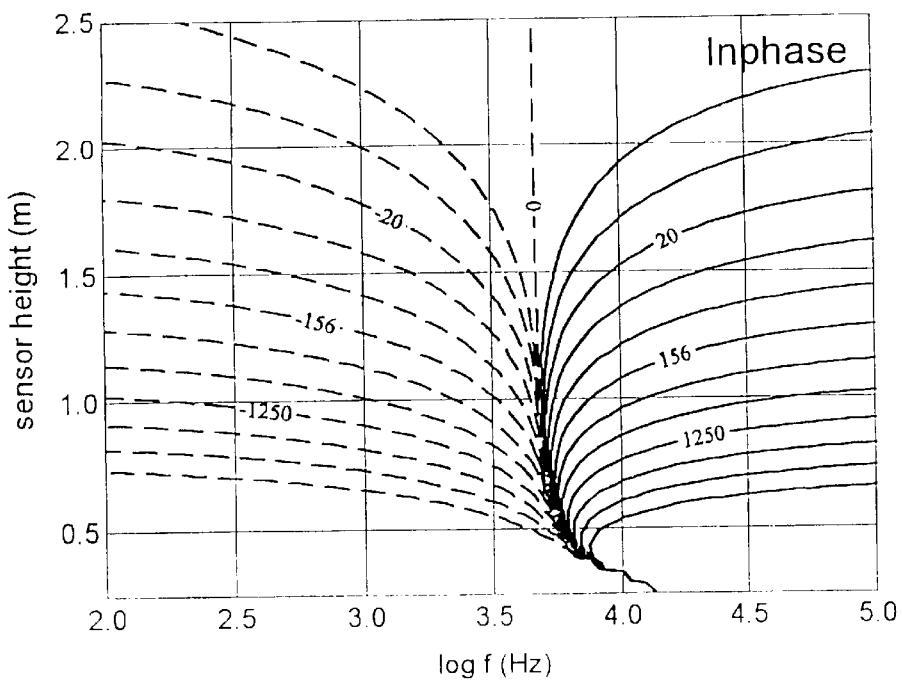
FIG. 1C is a theoretical spectrogram of inphase response as a function of frequency and spatial relationship for a 15 cm sphere having a conductivity of $2 \times 10^6$ s/m and a relative magnetic permeability of $\eta=500$.
Figure 1D:
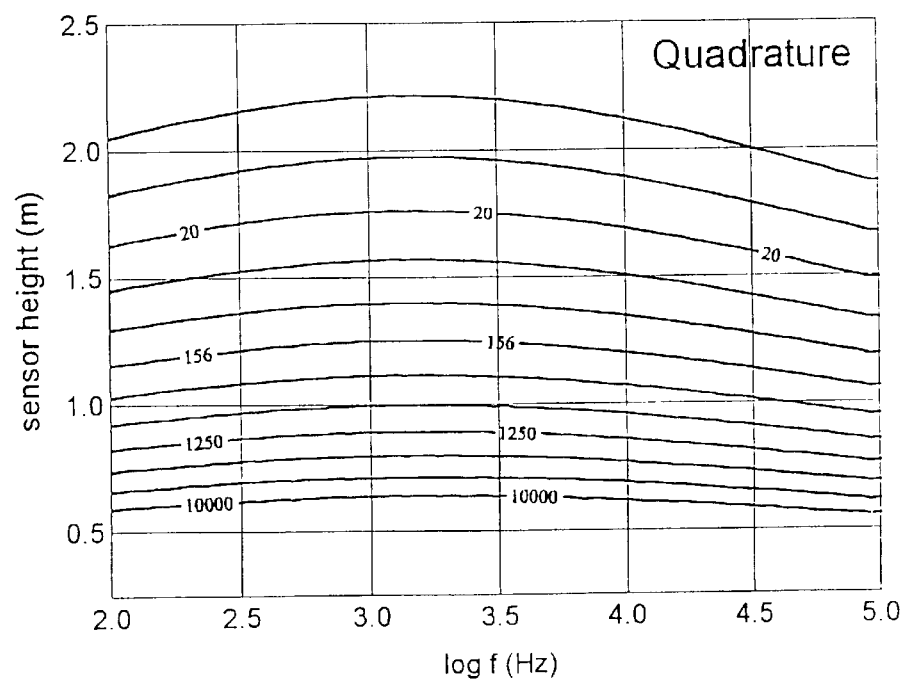
FIG. 1D is a theoretical spectrogram of quadrature response as a function of frequency and spatial relationship for the object of FIG. 1C.

Based on the above, the inphase and quadrature responses were calculated for both the conductive/non-permeable sphere and the conductive/permeable sphere. These theoretical calculations have been transformed into contour line spectrograms shown in FIGS. 1A–1D. FIGS. 1A and 1B are inphase and quadrature responses for the conductive/non-permeable sphere, respectively. FIGS. 1C and 1D are inphase and quadrature responses for the conductive/permeable sphere, respectively. In FIGS. 1A–1D, positive values are indicated by solid lines and negative values are indicated by dashed lines.

Based on the theoretical spectrograms of FIGS. 1A–1D, the following conclusions can be reached:

The inphase anomaly of a conductive/permeable sphere, as shown in FIG. 1C, changes its polarity at a specific frequency that is referred to as a crossover frequency. The crossover frequency for the inphase response of the conductive/permeable sphere occurs between the log frequency of 3.5 and 4.0. From the theoretical spectrogram of FIG. 1C, it is seen that the crossover frequency depends slightly on the height of the sensor. In contrast, for the conductive/non-permeable sphere, the crossover frequency is too low to appear within the range of frequencies of these theoretical spectrograms.

Below the crossover frequency, the inphase polarity is opposite between the conductive/non-permeable sphere and the conductive/permeable sphere. This polarity anomaly alone can distinguish whether the sphere is made of a magnetic material (for example, iron) or a non-magnetic material (for example, aluminum).

As seen in FIG. 1C, at or near the crossover frequency, the conductive/permeable sphere becomes undetectable in the inphase response. This emphasizes the need for measuring both the inphase and quadrature components in order to obtain a full spectrogram of the object being examined. Also, it stresses the necessity of broadband measurement to overcome such blind frequency zones.

The crossover frequency is rather sensitive to magnetic permeability and therefore the crossover frequency can be used to determine the type of magnetic material of an object being examined.

Further object discrimination may be possible by studying the field decay rate distance as a function of frequency. Because a sphere with a particular radius, conductivity, and permeability would generate a specific spectrogram, one can fingerprint a large array of spherical objects of interest for comparative information.

Now, turning to FIGS. 2A–2D, a series of contour line spectrograms are shown therein that compare theoretical and experimental magnetic field responses for a given or known object. In particular, the object being experimentally considered is a roughly hexagonal cylinder having an equivalent radius of approximately 6 centimeters when approximated as a sphere. The cylinder was composed of a material having a relative magnetic permeability of 200 and a conductivity of $3 \cdot 10^6$ s/m. The theoretical responses are based on a 6 centimeter radius sphere having a relative permeability of 200 and a conductivity of $3 \cdot 10^6$ s/m. To arrive at the experimental response, a magnetic field generator having a sweep frequency mode was used to obtain a continuous response spectrum at various sensor heights starting from about 20 centimeters and ending at 1 meter. The frequency range employed by the generator started at 410 Hz and ended at about 24 kHz. The generator/detector forming the basis for the theoretical and experimental responses was not a concentric transmitter/sensor configuration, but was a configuration having a horizontal offset between transmitter and sensor. An example of such a device is manufactured under the trademark "GEM-300" by Geophysical Survey Systems, Inc. of North Salem, N.H.

Figure 2A:
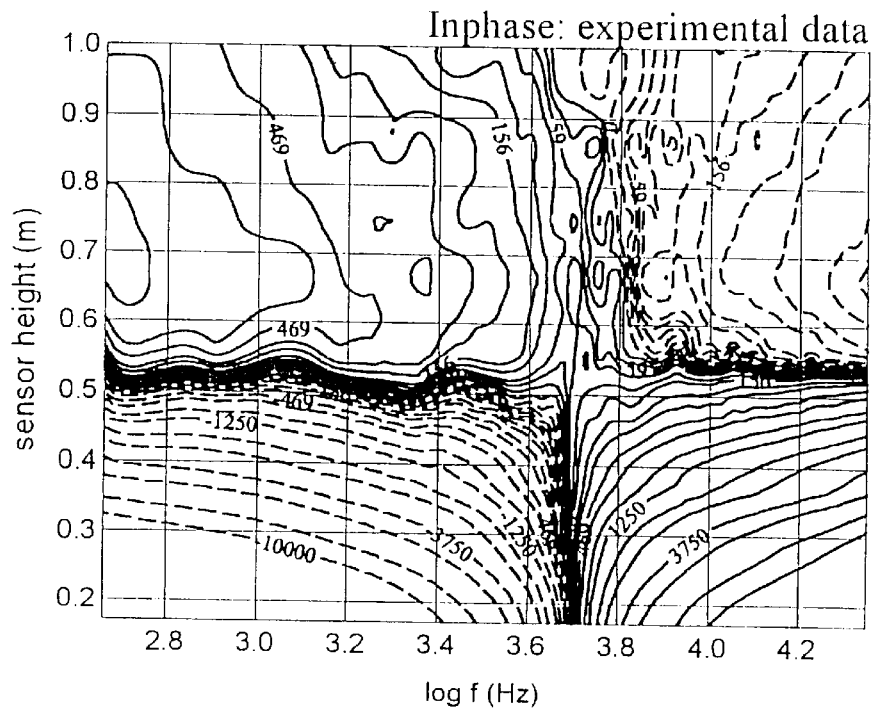
FIG. 2A is a measured spectrogram of inphase response as a function of frequency and spatial relationship for a roughly hexagonal cylinder having an equivalent spherical radius of 6 cm and having conductivity of $3 \times 10^6$ s/m and a magnetic permeability of $\eta=200$.
Figure 2B:
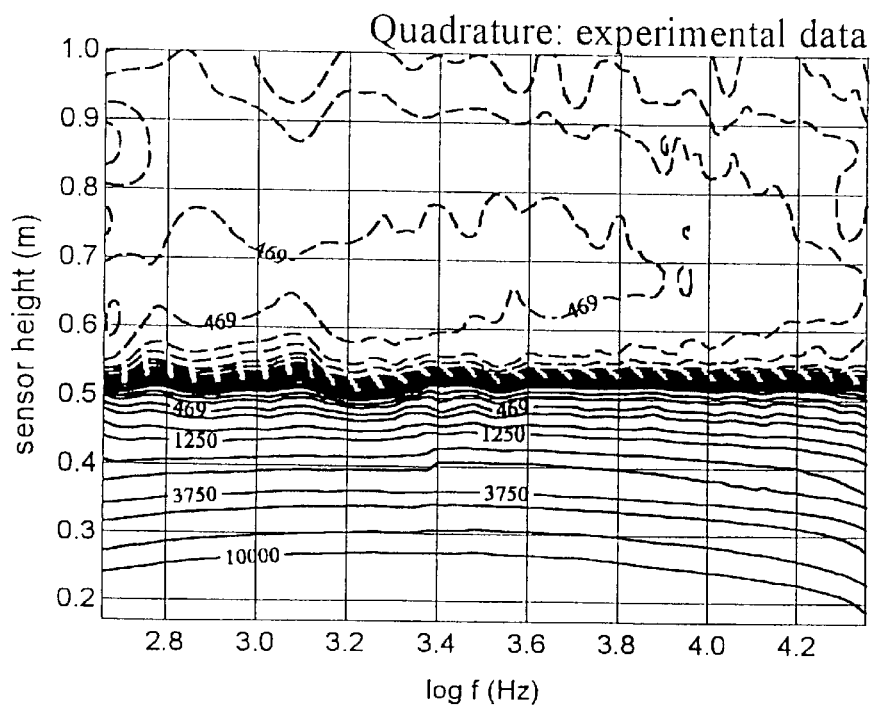
FIG. 2B is a measured spectrogram of quadrature response for the object of FIG. 2A.
Figure 2C:
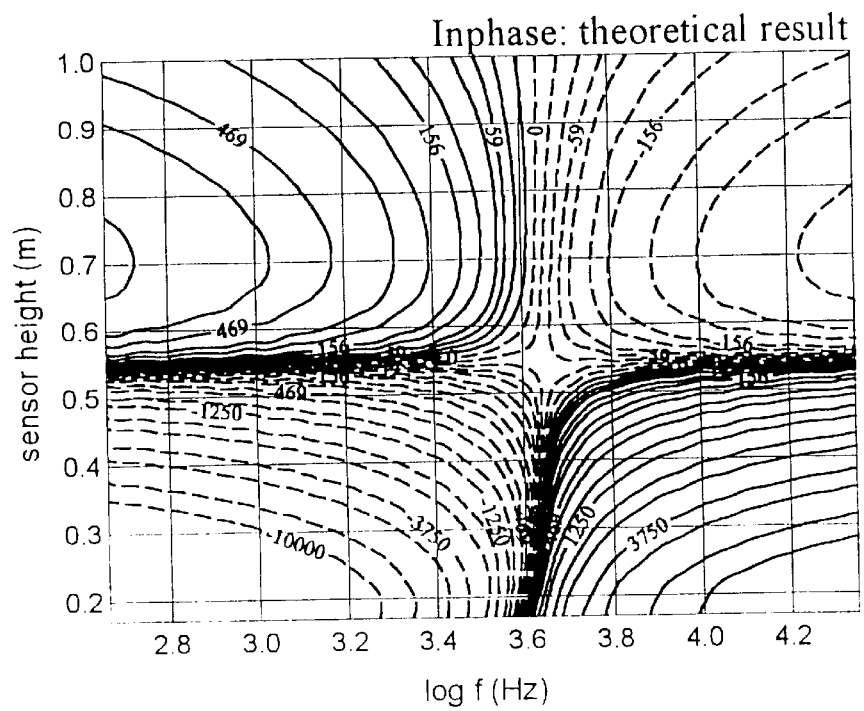
FIG. 2C is a theoretical spectrogram of inphase response as a function of frequency and spatial relationship for a 6 cm sphere having a conductivity of $3 \times 10^6$ s/m and a relative magnetic permeability of $\eta=200$.
Figure 2D:
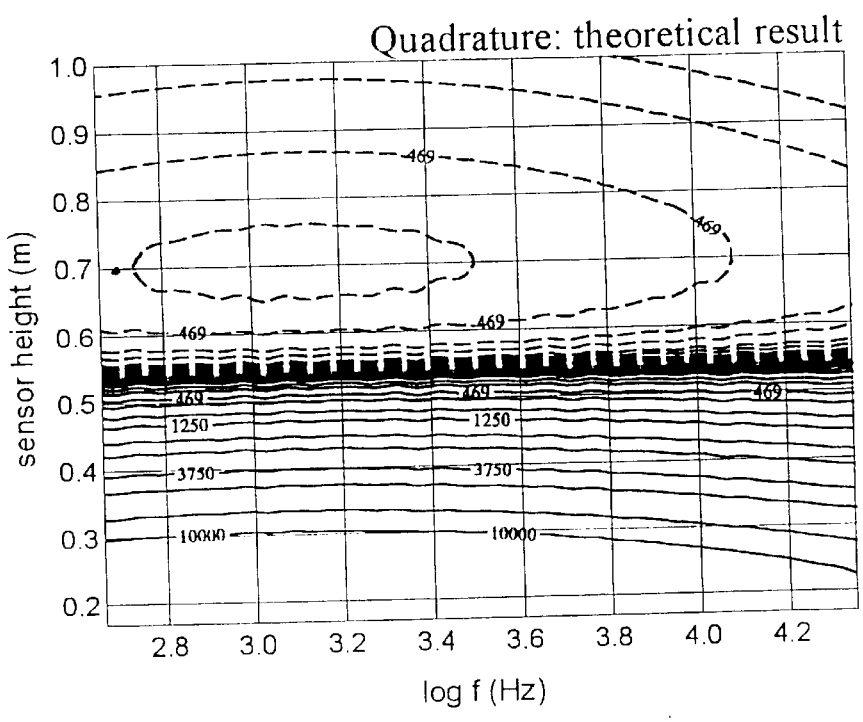
FIG. 2D is a theoretical spectrogram of quadrature response as a function of frequency and spatial relationship for the object of FIG. 2C.

FIGS. 2A and 2B show the inphase and quadrature responses for the actual experimental data collected in this case. FIGS. 2C and 2D show the inphase and quadrature responses for the corresponding theoretical model. As with FIGS. 1A–1D, the positive values in FIGS. 2A–2D are indicated by solid lines and negative values are indicated by dashed lines.

Comparing the experimental responses with the theoretical responses, one sees a distinct and clear correspondence. With respect to the theoretical response, we note a crossover frequency at approximately 4000 Hz (3.6 on the log scale) for the inphase component. For the sensor height, we note a distinct crossover frequency between 0.5 and 0.6 meters for the inphase component. The experimental data in FIGS. 2A and 2B show a clear inphase crossover at approximately 4700 Hz (3.67 on the log scale) and an inphase crossover between 0.5 and 0.6 meter sensor height. It is apparent from a comparison of the spectrograms that the experimental data corresponds well with the theoretical data.

Figure 3A:
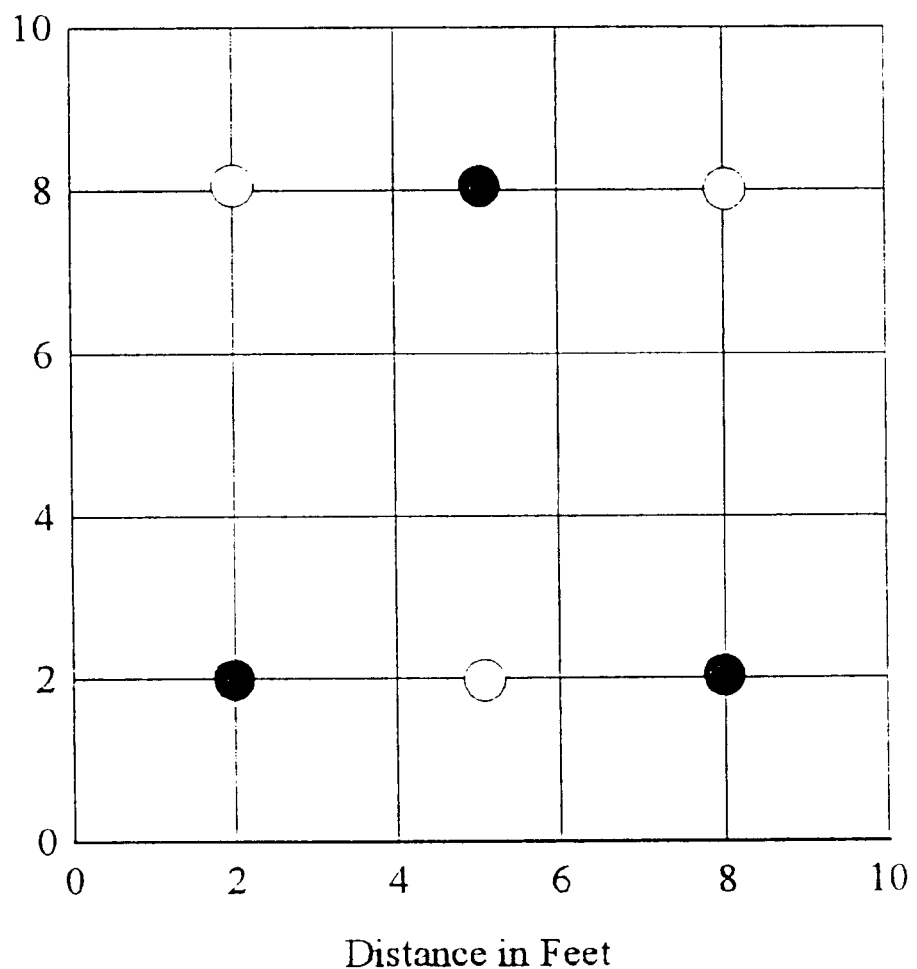
FIG. 3A is a schematic plot showing the location of six buried objects within a plot.
Figure 3B:
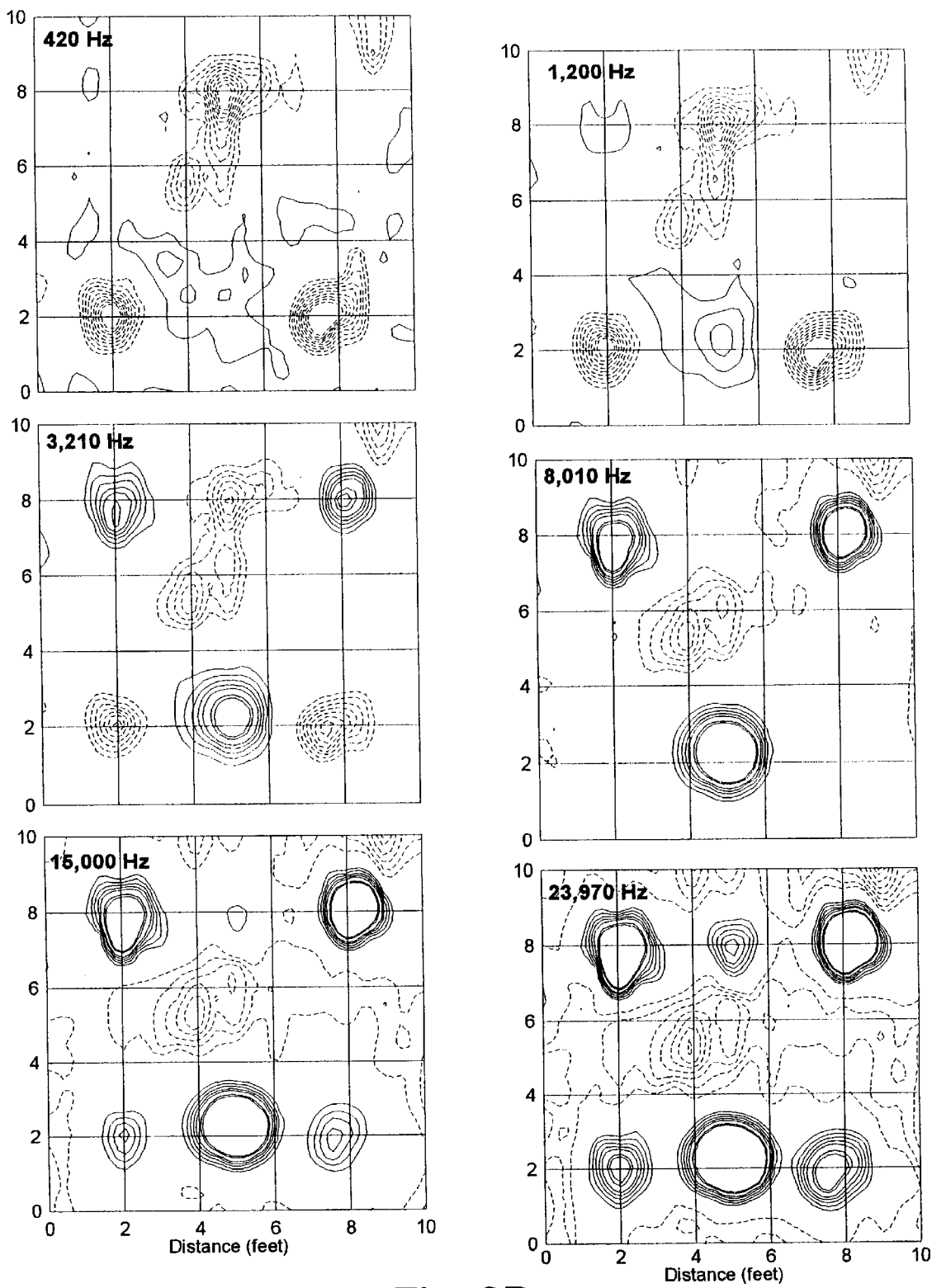
FIG. 3B is a measured inphase response at selected frequencies for the plot shown in FIG. 3A.
Figure 3C:
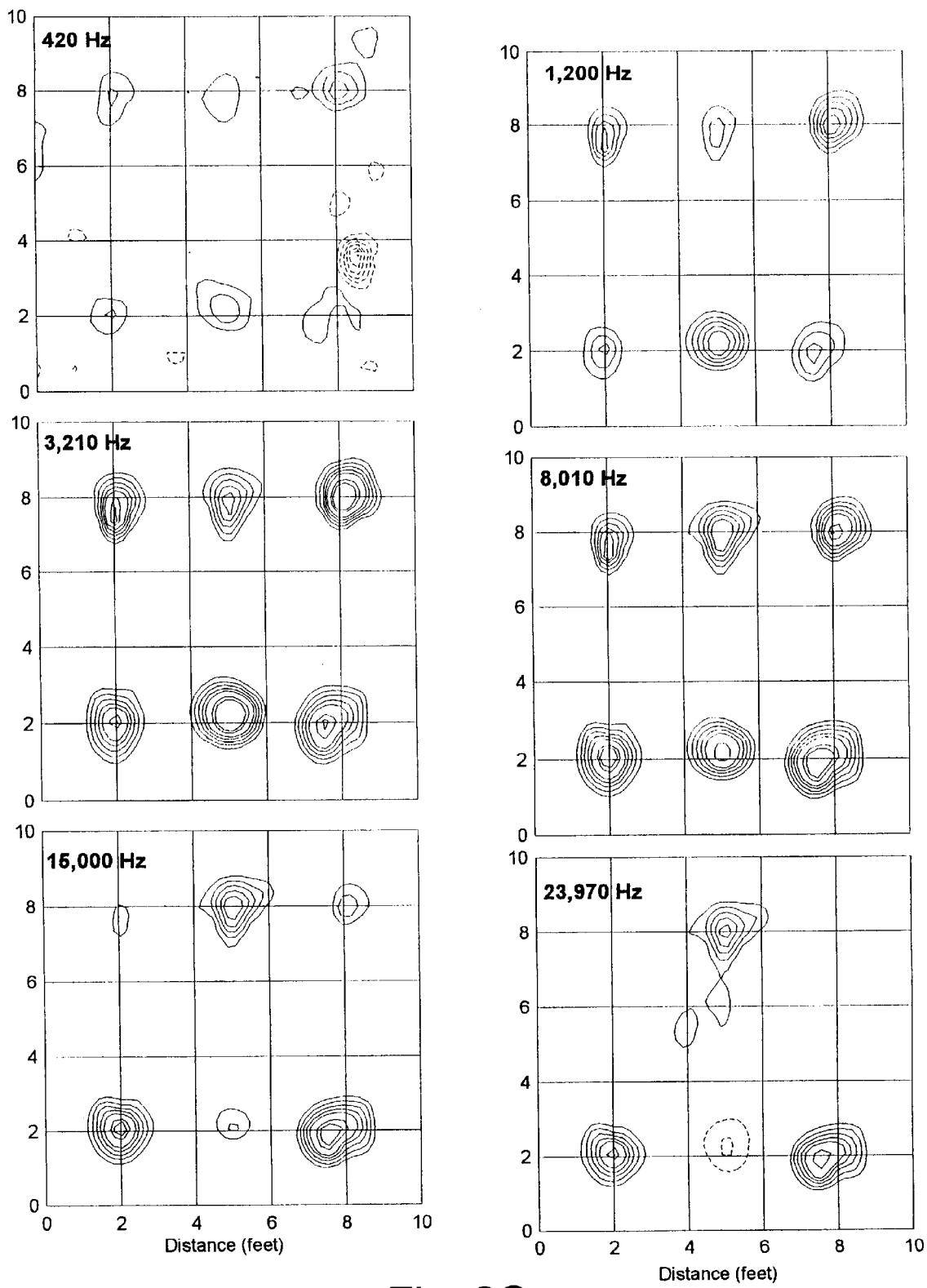
FIG. 3C is a measured quadrature response at selected frequencies for the plot shown in FIG. 3A.

Now, turning to FIGS. 3A–3C, there is shown therein a schematic of a plot of ground, 10'×10', that includes a group of six cans buried at a depth of approximately 8 inches in the ground. As FIG. 3A suggests, three of the cans were aluminum and three of the cans are steel. All six cans were approximately the size of common soda drink cans and were buried on their sides. FIGS. 3B and 3C are inphase and quadrature responses for induced magnetic fields associated with the respective cans. As with FIGS. 1A–1D, positive values in FIGS. 3B and 3C are indicated by solid lines and negative values are indicated by dashed lines. However, the values of the contour lines have been omitted for clarity. The contour lines are spaced generally at intervals of 10 ppm with the values of −10 ppm, 0 ppm, and 10 ppm omitted for added clarity. The frequencies associated with each plot are as indicated. In particular, the experimental data that forms the inphase and quadrature strength vs. location plots of FIGS. 3B and 3C was generated by an electromagnetic generator operating at six distinct frequencies from 420 Hz to 23,970 Hz. The sensor height of the generator was maintained at approximately 6 inches above the ground.

In reviewing the inphase and quadrature responses (FIGS. 3B and 3C), one notes that the inphase plots shows an opposite polarity between the aluminum cans and steel cans at low frequencies. However, as the frequency is increased, it is seen that both the aluminum and steel cans project the same polarity at high frequencies. The actual reverse of this relationship appears to be the case for the corresponding quadrature responses.

In addition, with respect to the aluminum cans, it can be concluded that the strength of the inphase response is of a relatively low value at low frequencies but progressively increases as the frequency is increased. The quadrature response, on the other hand, reaches its highest positive value around 5 kHz and decreases thereafter. These observed responses with respect to the aluminum cans are in line with expected responses based on theoretical analysis.

Now, with respect to the steel cans, the inphase responses begin at low frequencies with a strong negative value but become positive at a crossover frequency between 5 kHz and 11 kHz. The quadrature response, on the other hand, reaches its highest positive value around 11 kHz and slowly decreases thereafter. Again, with respect to the steel cans, these experimental responses are in line with expected responses based on theoretical analysis.

Therefore, it is clear from the experimental responses of FIGS. 3B and 3C that the method of the present invention can be utilized to indicate the material composition of buried or hidden objects.

The method of the present invention can be employed in various ways to identify characteristics and features of a hidden object. One approach to implementing the method entails compiling a library of reference spectrograms for known objects. For example, in the case of a land mine, the library of spectrograms would be compiled based on empirical data and would include an array of land mine spectrograms wherein the spectrograms would be based on known land mine characteristics and features such as size and shape, material composition, magnetic permeability, conductivity, and with the spectrograms being based on various spatial relationships between the known land mine and the magnetic field generator. The spectrograms would then be appropriately stored in the memory of a computer, preferably connected to the detector portion of the magnetic field generator. By utilizing appropriate software designed to compare a manual or experimental spectrogram with the full library of reference spectrograms, the software would detect corresponding anomalies and trends and by weighing and averaging the overall similarities, would be able to characterize or at least postulate as to the characteristics and features of the hidden object that is the subject of the experimental or measured spectrogram. Clearly, one can discriminate between ferrous and non-ferrous objects. Further, one can, through empirical study, experience and theoretical analysis, use the spectrograms of the present invention as an indicator of size and shape, conductivity, material composition and/or other characteristics of the object.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of generating a spectrogram that is useful in identifying or characterizing a hidden object comprising:
    a) generating a time-varying multi-frequency primary electromagnetic field at a plurality of frequencies within a low frequency broadband spectrum;
    b) inducing a responsive time-varying multi-frequency secondary electromagnetic field about the hidden object in response to said primary electromagnetic field;
    c) measuring, over a continuous segment of a low frequency broadband spectrum, the strength of the secondary electromagnetic field at a sensor having a varying spatial relationship with respect to the hidden object; and
    d) forming a measured spectrogram by plotting the strength of the secondary electromagnetic field as a function of both the spatial relationship between the sensor and the hidden object and frequency including at least said continuous segment of the low frequency broadband spectrum.

2. The method of claim 1 including compiling a library of reference spectrograms and identifying characteristics of the hidden object by comparing one or more reference spectrograms with said measured spectrogram.

3. The method of claim 1 wherein the low frequency broadband spectrum includes a frequency range of approximately 100 Hz to approximately 300 kHz.

4. The method of claim 1 wherein measuring the strength of the secondary electromagnetic field includes measuring the strength of an inphase response of the secondary electromagnetic field and plotting the same over the segment of frequencies to form at least a part of the measured spectrogram.

5. The method of claim 1 wherein measuring the strength of the secondary electromagnetic field includes measuring the strength of a quadrature response of the secondary electromagnetic field and plotting the same over a segment of frequencies to form at least a part of the measured spectrogram.

6. The method of claim 1 including plotting the strength of the secondary electromagnetic field on the spectrogram in color such that various colors and intensity levels of the colors represent different polarities and magnitudes of strength of the secondary electromagnetic field.

7. The method of claim 2 wherein the library of reference spectrograms include empirically generated spectrograms that represent in part at least material composition characteristics of certain objects.

8. The method of claim 7 wherein the library of reference spectrograms include empirically generated spectrograms that represent in part at least shape and size characteristics of certain objects.

9. The method of claim 1 wherein the measured spectrogram includes at least one portion that characterizes the magnetic permeability of the hidden object.

10. The method of claim 1 wherein the measured spectrogram includes at least one portion that characterizes the conductivity of the hidden object.

11. The method of claim 1 wherein the spectrogram extends over a selected frequency range and visually represents identifying characteristics of the hidden object such as magnetic permeability, conductivity, material composition, and shape and size.

12. A method of using electromagnetic induction to identify a hidden object, comprising:
   a) generating a multi-frequency primary electromagnetic field over a plurality of frequencies within a low frequency broad band spectrum;
   b) inducing a multi-frequency secondary electromagnetic field about the hidden object in responses to the primary electromagnetic field;
   c) with a sensor, measuring the strength of the secondary field over a segment of the low frequency broadband spectrum and at various spatial relationships between the sensor and the hidden object, such that the measured strength is a function of both frequency and the spatial relationship between the sensor and the hidden object; and
   d) utilizing the measured strength of the secondary field at various frequencies within the spectrum and at various spatial relationships to identify the hidden object.

13. The method of claim 12 including forming a spectrogram by plotting the strength of the secondary magnetic field as a function of frequency over a segment of the low frequency broadband spectrum.

14. The method of claim 13 wherein the spectrogram over the segment of frequency of the spectrum reveal characteristics of the hidden artificial object such as conductivity, magnetic permeability, material composition, and size and shape.

15. The method of claim 13 wherein measuring the strength of the secondary magnetic field includes measuring the inphase response of the secondary field over a segment of frequencies within the low frequency broadband spectrum and incorporating the inphase response into the spectrogram.

16. The method of claim 13 wherein measuring the strength of the secondary magnetic field includes measuring the quadrature response of the secondary field over a segment of frequencies within the low frequency broadband spectrum and incorporating the quadrature response into the spectrogram.

17. The method of claim 13 wherein the strength of the secondary field is monitored by a sensor spaced from the hidden artificial object in a varying spatial relationship thereto, and wherein the spectrogram indicates the strength of the secondary field as a function of the spatial relationship between the sensor and the hidden artificial object.

18. The method of claim 12 including empirically establishing reference secondary field responses for a variety of different objects having known characteristics and compiling a library of these reference secondary field responses, and identify the hidden artificial object by comparing the measured secondary field strength response of the hidden artificial object to one or more reference secondary field responses.

19. The method of claim 18 including plotting the strength of the measured secondary field as a function of frequency to form a measured spectrogram, and forming the reference secondary field responses into reference spectrograms such that the hidden artificial object may be identified by comparing the measured spectrogram with one or more of the reference spectrograms.

20. The method of claim 19 wherein both the measured and referenced spectrograms continuously extend over a range of the low frequency broadband spectrum.

21. The method of claim 13 wherein the low frequency broadband spectrum includes a frequency range of approximately 100 Hz to 300 kHz.

22. The method of claim 13 wherein the secondary magnetic field is plotted continuously over a selected range of frequencies within the broadband spectrum to form a continuous spectrogram.

* * * * *